United States Patent
Yasumura

[11] Patent Number: 5,973,946
[45] Date of Patent: *Oct. 26, 1999

[54] POWER-FACTOR IMPROVEMENT CONVERTER

[75] Inventor: Masayuki Yasumura, Tokyo, Japan

[73] Assignee: Sony Corporation, Tokyo, Japan

[*] Notice: This patent is subject to a terminal disclaimer.

[21] Appl. No.: 09/083,771

[22] Filed: May 22, 1998

Related U.S. Application Data

[63] Continuation of application No. 08/739,954, Oct. 30, 1996, Pat. No. 5,835,368.

[30] Foreign Application Priority Data

Oct. 31, 1995 [JP] Japan .................................. 7-305242

[51] Int. Cl.[6] .................................................. H02M 3/338
[52] U.S. Cl. ............................ 363/89; 363/97; 363/124
[58] Field of Search ............................ 363/89, 124, 97, 363/21, 133; 323/222

[56] References Cited

U.S. PATENT DOCUMENTS 5,640,310  6/1997  Yasumura ................................. 363/97

FOREIGN PATENT DOCUMENTS 0 621 743  10/1994  European Pat. Off. .
0 667 734   8/1995  European Pat. Off. .
0 707 376   4/1996  European Pat. Off. .
0 726 640   8/1996  European Pat. Off. .

*Primary Examiner*—Peter S. Wong
*Assistant Examiner*—Derek J. Jardieu
*Attorney, Agent, or Firm*—Frommer Lawrence & Haug, LLP.; William S. Frommer

[57] ABSTRACT

To improve the power conversion efficiency of a power circuit provided with a power-factor improvement converter and reduce the size, weight, and cost of the circuit, the power-factor improvement converter according to the invention is provided at a stage in front of the switching power circuit, in which a self-excited current resonant switching converter with a simple circuit construction is provided and the switching voltage thereof is fed back to the rectifying path via series resonant circuits so as to improve the power factor.

4 Claims, 6 Drawing Sheets

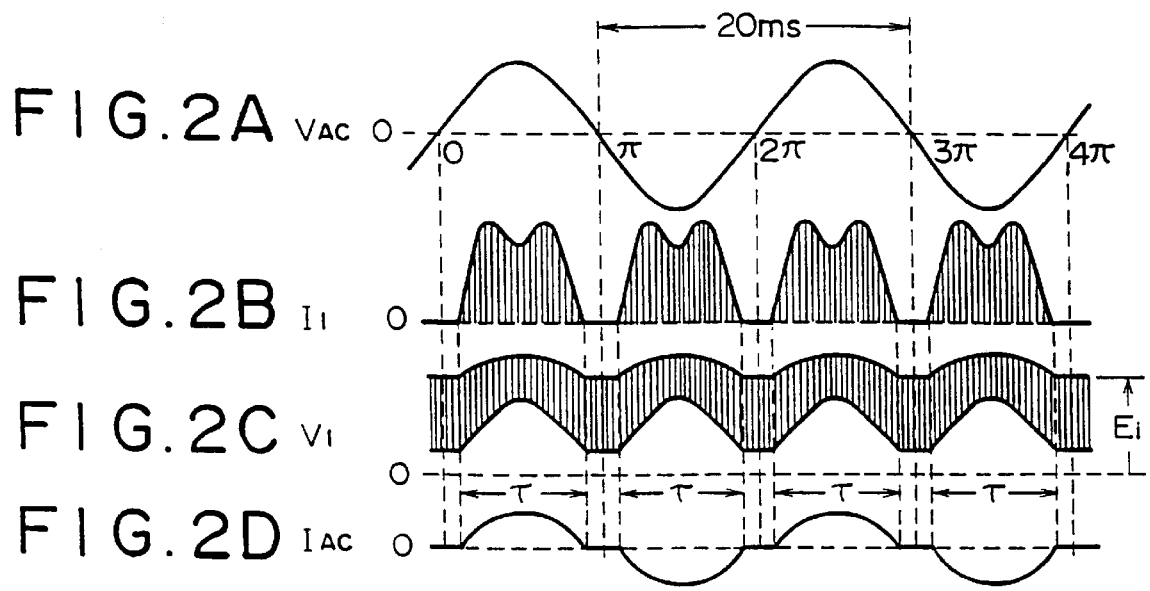
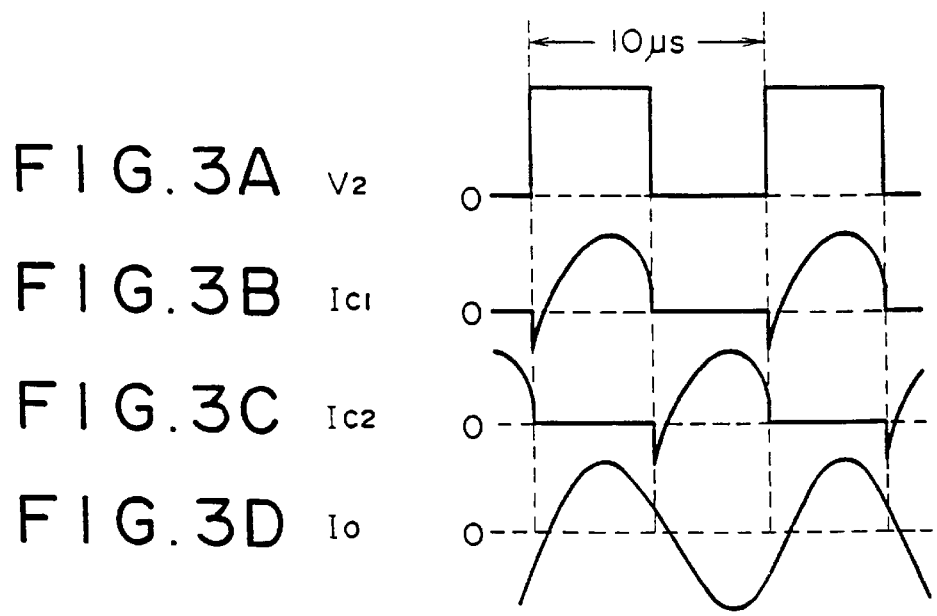

POWER-FACTOR IMPROVEMENT CONVERTER

This is a continuation of Application No. 08/739,954, filed Oct. 30, 1996, U.S. Pat. No. 5,835,368.

BACKGROUND OF THE INVENTION

1. Field of the Invention

The present invention relates to a power-factor improvement converter for improving the power-factor of a switching power circuit.

2. Description of Related Art

Owing to the recent development and advancement of switching elements that can withstand a comparatively high current and voltage of high frequency, the switching power supply has become very popular in obtaining a desired dc voltage by rectifying the power-frequency power source.

The switching power supply can be made smaller because transformers and other components can be made smaller by setting the switching frequency higher, so that it has been widely applied to the power supply of various electronic equipment as a high-power DC-DC converter.

Generally, rectifying the power-frequency power source produces a distorted waveform running through a smoothing circuit, which lowers the power-factor that indicates the efficiency in use of the power.

And, the distorted current waveform creates interfering harmonics, thereby requiring a countermeasure to suppress the harmonics.

As means for improving the power-factor in the switching power circuit, a method of using the so-called active filter is known which applies a boosting converter by the PWM control system to a rectifying circuit to increase the power-factor to 1.

FIG. 7 is a circuit diagram showing an example of a switching power circuit that the present inventor has proposed aiming at improving the power-factor using the foregoing active filter.

In the power circuit shown in FIG. 7, a common mode choke coil CMC and across condenser $C_L$ are used as a noise filter for removing common mode noises to the AC power-frequency.

The AC power-frequency is rectified in full-wave by a bridge rectifying circuit $D_1$. In this case, an active filter 20 is interposed between the output of the bridge rectifying circuit $D_1$ and a smoothing condenser Ci of a smoothing circuit, and it is to improve the power-factor as described later.

The switching power circuit 1 is a DC-DC converter, receiving an input voltage $E_1$ that is rectified and smoothed at both ends of the smoothing condenser Ci and performing a switching operation to supply dc output voltage $E_1$, $E_2$. In this case, the foregoing switching power circuit 1 is equipped with a switching converter for controlling to stabilize the output by the PWM system. Further, the active filter is a boosting type, the dc voltage (rectified and smoothed voltage $E_1$) generated by this active filter 20 is controlled to a constant, for example, about 380 V against the variation of the AC input voltage.

Next, the construction of the active filter 20 will be described.

In the active filter 20 shown in FIG. 7, a filter choke coil $L_N$—winding Li of choke coil CH—ferrite beads $FB_2$— high-speed recovery type rectifying diode $D_{12}$ are connected in series.

Two filter condensers $C_N$ are connected from both ends of the filter choke coil $L_N$ to the primary ground, and the filter choke coil $L_N$ and the filter condensers $C_N$, $C_N$ form the so-called π-type normal mode low-pass filter. And, the aforementioned common mode and the normal mode noise filter prevent harmonic noises including switching noises from flowing into the AC power-frequency power source.

The winding Li of choke coil CH is interposed as an energy storage means being a higher voltage source or higher current source than the rectified voltage, so that it can pour current into the load (switching converter) during the open period of a switching element $Q_{20}$ described later.

And, the high-speed recovery type rectifying diode $D_{12}$ is interposed corresponding to a high frequency current running out into the rectifier output accompanying with the switching operation of the switching element $Q_{20}$.

The rectified current running into the rectifier output through the winding Li of choke coil CH and the high-speed recovery type rectifying diode $D_{12}$ is charged into the smoothing condenser Ci, at both ends of which the rectified and smoothed voltage is obtained which is served as the operating power source for the following switching power circuit 1.

And, this case applies, for example, a MOS-FET transistor to the switching element $Q_{20}$ forming the active filter. The drain of the FET is connected to the winding Li of choke coil CH via ferrite beads $FB_1$ and to the anode of the high-speed recovery type rectifying diode $D_{12}$ through the ferrite beads $FB_1$ and $FB_2$. The source of the FET is connected to the primary earth via a rush current limiting resister $R_{D1}$. The switching element $Q_{20}$ receives at the gate a switching drive signal from a drive circuit in the active filter control circuit 20 described later, and thereby it performs a switching operation.

And, in this active filter 20, a snubber circuit composed of the ferrite beads $FB_1$ and a condenser $C_{S1}$ and resister $R_{SA}$ is provided for the foregoing switching element $Q_{20}$, and another snubber circuit composed of the ferrite beads $FB_2$ and a condenser $C_{S2}$ and resister $R_{SB}$ is provided for the high-speed recovery type rectifying diode $D_{12}$.

The switching element $Q_{20}$ and the high-speed recovery type rectifying diode $D_{12}$ each perform the switching operation based on the PWM control of the active filter control circuit 20A, as described below. Since the rise/fall time of turn-on/turn-off current thereat is short, the switching operation involves radiation noises of comparably high levels. Therefore, interposing the foregoing snubber circuits blunts the slope of the rise/fall of the switching current waveform, thereby suppressing the radiation noises.

The active filter control circuit 20A controls the operation of the active filter that improves the power-factor so as to raise to 1, which is composed of, for example, one integrated circuit (IC).

The active filter control circuit 20A comprises a starting circuit for driving the switching element $Q_{20}$ when the power is turned on, an oscillating circuit for generating a specific switching frequency, a drive circuit for amplifying the signal of the foregoing oscillating frequency and generating a gate signal to drive the switching element $Q_{20}$, a PWM control circuit for controlling a switching drive signal fed from the foregoing drive circuit by the PWM control system, and a multiplier that multiplies on the basis of the input of a feed-forward and feedback circuit described below to generate a control input signal for the foregoing PWM control circuit.

A dividing resister $R_1$ and $R_2$ in series are interposed in parallel between the positive output terminal of the bridge rectifying circuit $D_1$ and the primary ground. The divided potential by the dividing resister $R_1$ and $R_2$ is entered into the active filter control circuit 20A, which forms the feed-forward circuit corresponding to the AC input voltage.

And, the feedback circuit is formed such that a dividing resister $R_3$ and $R_4$ divide the both end voltage (rectified smoothed voltage) across the smoothing condenser Ci and the divided potential is entered into the active filter control circuit 20A. Namely, the active filter control circuit 20A receives a voltage corresponding to the AC input voltage through the feed-forward circuit and a voltage corresponding to the rectified smoothed voltage through the feedback circuit.

Further, the output of a half-wave rectifying circuit by a winding $N_5$ wounded on the choke coil CH and a rectifying diode $D_6$ is supplied to the active filter control circuit 20A as the operating power source.

The operation will now be outlined on how the power-factor is improved by the aforementioned active filter.

The active filter control circuit 20A detects an AC input voltage on the basis of the voltage entered through the feed-forward circuit and enters it into the multiplier inside. On the other hand, the active filter control circuit 20A detects a varying difference of the rectified smoothed voltage on the basis of the voltage entered through the feedback circuit. The active filter control circuit 20A controls the average voltage of the rectified smoothed voltage Ei to stabilize within 360 V–380 V on the basis of the varying difference of the rectified smoothed voltage and enters the varying difference of the rectified smoothed voltage into the multiplier inside.

And, the multiplier multiplies the AC input voltage and the varying difference of the rectified smoothed voltage which are detected as described above. The multiplication creates a command value of current with the same waveform as the AC input voltage $V_{AC}$.

And, the PWM control circuit compares the foregoing current command value with the actual AC input current, and creates a PWM signal corresponding to the difference to supply it to the drive circuit. The switching element $Q_{20}$ is driven by a drive signal based on the PWM signal. Consequently, the AC input current is controlled so as to have the identical waveform to the AC input voltage, whereby the power-factor is improved to come close to almost 1. In this case, the power-factor of 0.95–0.99 can be obtained against the AC input voltage and load variation.

And also in this case, since the current command value created by the multiplier is controlled so that the amplitude can vary corresponding to the varying difference of the rectified smoothed voltage, the variation of the rectified smoothed voltage is also suppressed.

In the power circuit shown in FIG. 7, the active filter control circuit 20 is used as a power-factor improvement converter, and the components are expensive as well as the number of the components is comparably large, which is disadvantageous in producing the circuit in a small size and at a low cost.

And, in the power circuit shown in FIG. 7, since the active filter control circuit 20 and the following switching power circuit 1 perform the switching operation according to the PWM control system, the operation handles rectangular waveform, which inevitably involves a high radiation of EMI (electromagnetic interference). To take a measure for this, it is necessary, for example, to enhance the performance of the normal mode low-pass filter ($L_N$ and $C_N$, $C_N$) and the common mode noise filter (CMC, $C_L$), thus it leads to a big size of components for the noise filter and increasing the production cost.

And, as a measure for the EMI, applying the foregoing snubber circuit to the switching element $Q_{20}$ and the high-speed recovery type rectifying diode $D_{12}$ in the active filter control circuit 20 is known to increase a power loss for the insertion; for example, in the active filter control circuit 20 in FIG. 7, the AC-DC power conversion efficiency reduces to about 90%. Therefore, assuming that the DC-DC conversion efficiency of the switching power circuit 1 is about 85%, the overall power conversion efficiency as the total power circuit is reduced to 90%×85%=76.5%.

Furthermore, in the active filter control circuit 20 shown in FIG. 7, since the dc output voltage (rectified smoothed voltage Ei) is controlled to be about 380 V constant, applying an existing switching power circuit for 100 VAC to the 100 VAC system is impossible as it is. various design modifications including increase of withstand voltage of the switching element are needed, which is also disadvantageous in regard to cost.

SUMMARY OF THE INVENTION

The present invention has been made in view of the foregoing problems, and an object of the present invention is to provide a power-factor improvement converter that can be made less expensive and smaller than an active filter control circuit system and enhance the electric characteristics including power conversion efficiency.

In order to accomplish the aforementioned object, according to one aspect of the invention, a power-factor improvement converter is disclosed which comprises:

a normal mode low-pass filter formed of a filter choke coil and a filter condenser, provided at an output of a rectifying circuit;

a high-speed recovery type rectifying element interposed in series on a rectifying current path of a rectifying circuit;

a current resonant switching converter that performs a switching operation using a rectified smoothed voltage distributed from a smoothing circuit as an operating power source and supplies a switching output thereof to a series resonant circuit formed of a series resonance condenser and an inductor of a series resonant winding; and a power-factor improvement circuit for improving a power-factor based on the switching output fed back to the rectifying current path from the series resonant circuit.

According to the foregoing construction, the switching output through a self-excited current resonant converter is fed back to the rectified path so as to improve the power-factor. Therefore, the circuit construction is simplified and switching noises are reduced to a low level. And, the current resonant converter according to the present invention produces a dc output voltage (rectified smoothed voltage) corresponding to the AC input voltage.

BRIEF DESCRIPTION OF THE DRAWINGS

The present invention will be fully understood from the detailed description given below and from the accompanying drawings of the preferred embodiments of the invention, which, however, should not be taken to limit the specific embodiment, but are for explanation and understanding, in which:

FIGS. 2A to 2D are waveform charts showing the operation of the power-factor improvement converter of the embodiment from the power frequency;

FIGS. 3A to 3D are waveform charts showing the operation of the power-factor improvement converter of the embodiment from the switching frequency;

DESCRIPTION OF THE PREFERRED EMBODIMENTS

Figure 1:
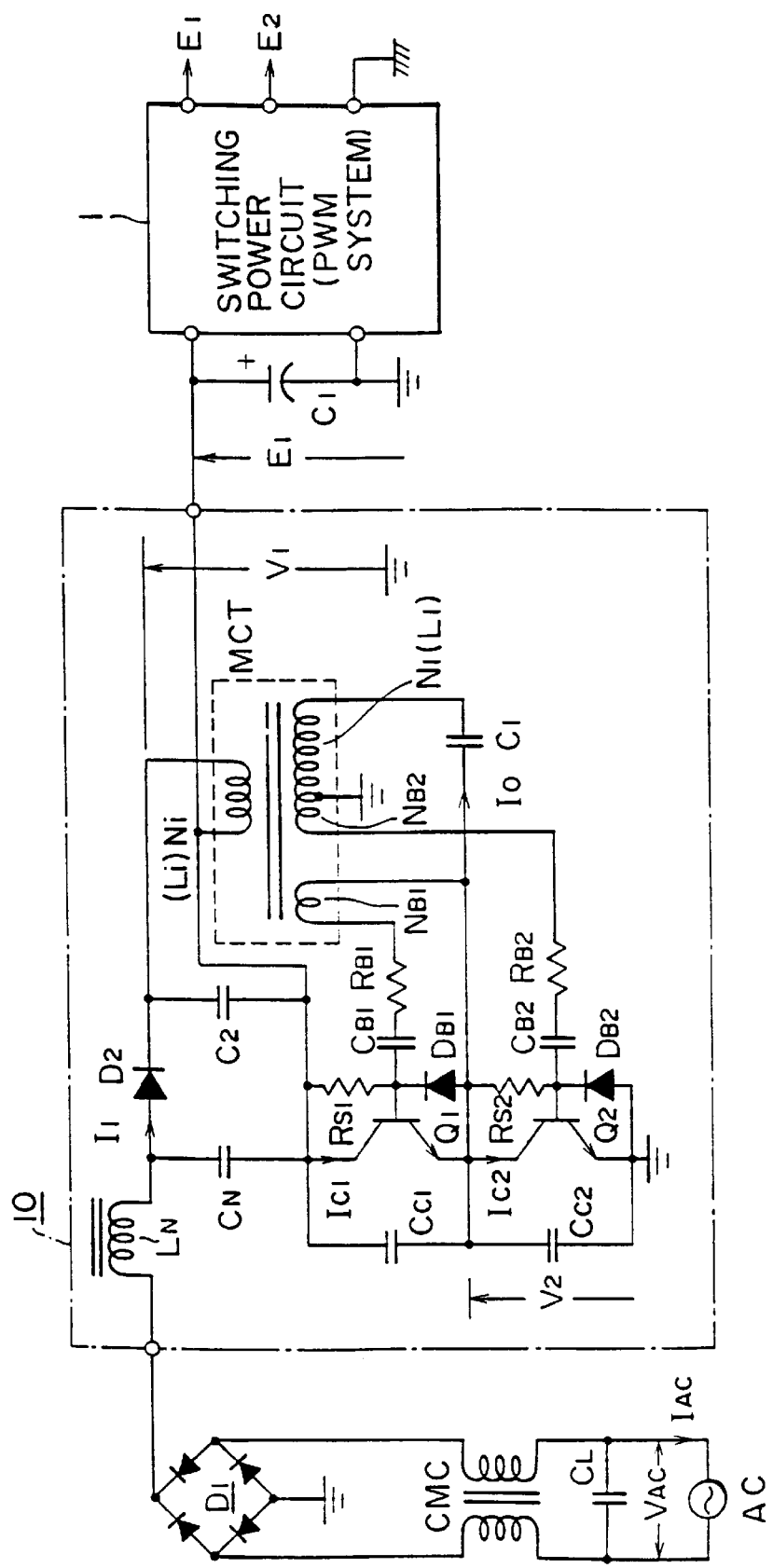
FIG. 1 is a circuit diagram showing a construction of a switching power circuit provided with a power-factor improvement converter of one embodiment according to the present invention.
Figure 7:
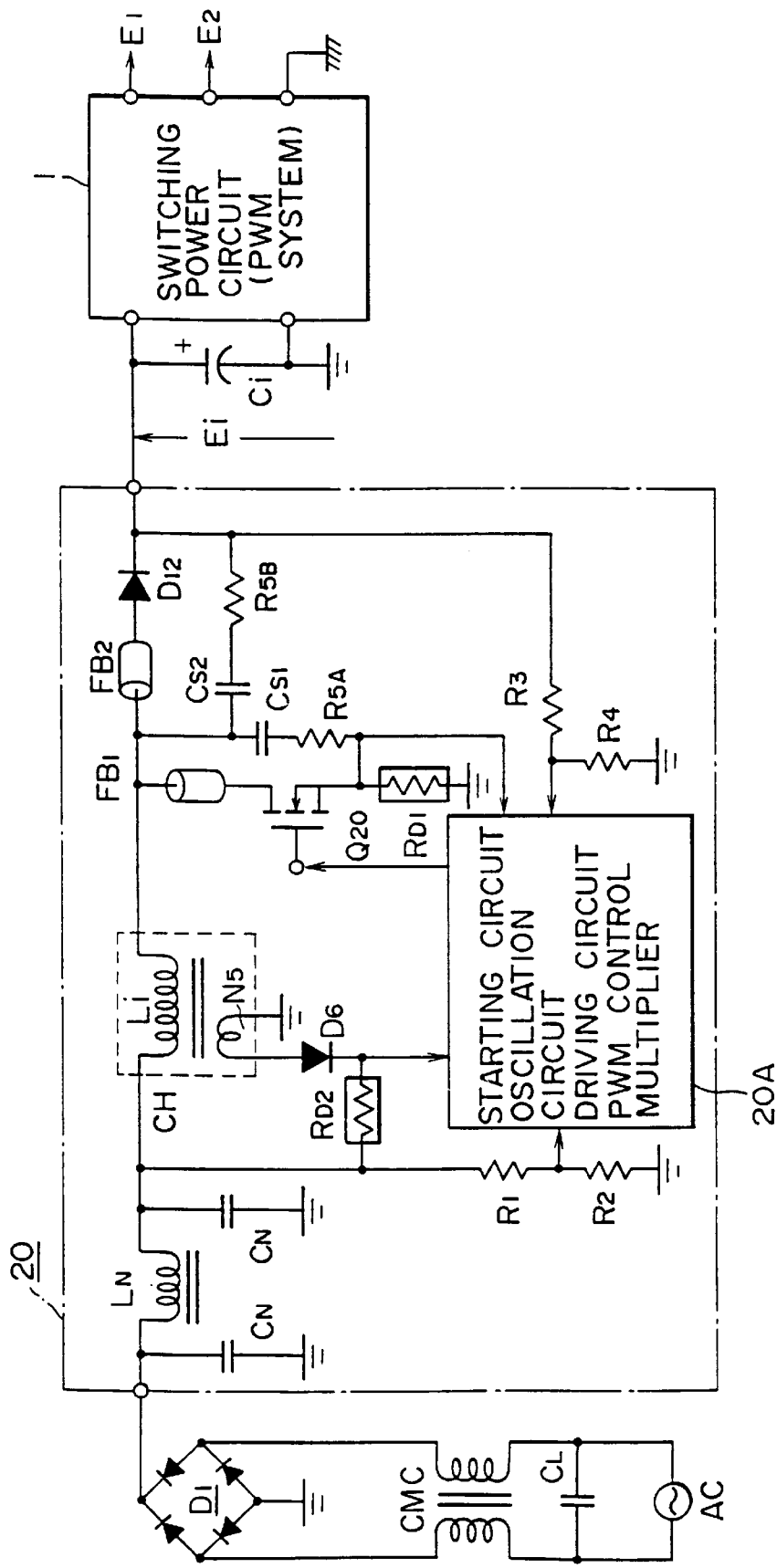
FIG. 7 is a circuit diagram showing a construction of a switching power circuit provided with a power-factor improvement converter of a related art.

FIG. 1 is a circuit diagram showing a construction of a switching power circuit provided with a power-factor improvement converter of the first embodiment according to the present invention, and the identical parts to those in FIG. 7 have the same numbers and the explanation on them will be omitted.

In a power-factor improvement converter 10 in FIG. 1, a filter choke coil $L_N$—high-speed recovery type rectifying diode $D_2$—secondary winding Ni of a magnetic coupling transformer MCT are interposed in series (on the rectified output line) between the positive output terminal of a bridge rectifying circuit $D_1$ and that of a smoothing condenser Ci. In this case, the high-speed recovery type rectifying diode $D_2$ is interposed so that the anode is directed toward the bridge rectifying circuit $D_1$.

Further, a filter condenser $C_N$ is interposed between the connection point of the foregoing filter choke coil $L_N$ and high-speed recovery type rectifying diode $D_2$ and the positive terminal of the smoothing condenser Ci. The filter condenser $C_N$ and the filter choke coil $L_N$ form a normal mode low-pass filter. And, a resonant condenser $C_2$ is connected in parallel to the secondary winding Ni of the magnetic coupling transformer MCT, whose function will be described later.

This power-factor improvement converter 10 is provided with the self-excited current resonant converter using the rectified smoothed voltage Ei as the operating power source.

This current resonant converter is provided with two switching elements $Q_1$, $Q_2$ connected through the collectors and emitters to be interposed in parallel between the positive terminal of the smoothing condenser Ci and the primary ground.

Starting resisters $R_{S1}$, $R_{S2}$ are inserted between each collector and base of the switching elements $Q_1$, $Q_2$ and resisters $R_{B1}$, $R_{B2}$ regulate base currents (drive current) of the switching element $Q_1$, $Q_2$. And, damper diodes $D_{B1}$, $D_{B2}$ are inserted between each base and emitter of the switching elements $Q_1$, $Q_2$. And, resonant condensers $C_{B1}$, $C_{B2}$ as well as drive windings $N_{B1}$, $N_{B2}$ form self-oscillating switching power circuits.

And, condensers $C_{C1}$, $C_{C2}$ are connected in parallel between each collector and emitter of the switching elements $Q_1$, $Q_2$ to suppress switching noises radiated from the switching elements $Q_1$, $Q_2$. Further, inexpensive condensers such as a ceramic condenser can be applied to the condensers $C_{C1}$, $C_{C2}$.

The magnetic coupling transformer MCT is constructed such that the primary winding $N_1$ and the secondary winding Ni are wounded in a magnetically close coupling. Further in this case, in addition to the foregoing primary winding $N_1$ and the secondary winding Ni, the drive windings $N_{B1}$, $N_{B2}$ are wounded as the third windings. And, the drive winding $N_{B2}$ is wound up on the primary winding $N_1$.

One terminal of the primary winding $N_1$ of the magnetic coupling transformer MCT is connected to the connection point (switching output point) of the emitter of the switching element $Q_1$ and the collector of the switching element $Q_2$ via series resonance condenser $C_1$, and the other terminal is connected to the primary ground; thereby supplying the switching output to the primary winding $N_1$.

In this case, the primary winding $N_1$ of the magnetic coupling transformer MCT is connected in series to the series resonance condenser $C_1$, and the inductance of the primary winding $N_1$ and the capacitance of the series resonance condenser $C_1$ form a series resonant circuit that renders this switching converter to be a current resonant.

And, one terminal of the drive winding $N_{B1}$ on the side of the switching element $Q_1$ which is wound up onto the magnetic coupling transformer MCT is connected to the resister $R_{B1}$ via the resonant condenser $C_{B1}$, and the other terminal is connected to the emitter of the switching element $Q_1$. And one terminal of the drive winding $N_{B2}$ on the side of the switching element $Q_2$ is connected to the ground, and the other terminal is connected to the resister $R_{B2}$ via the resonant condenser $C_{B2}$. And, the polarity of the drive winding $N_{B2}$ is just opposite to that of the drive winding $N_{B1}$ to produce a voltage of reverse polarity.

The switching operation of the switching power supply having the foregoing construction is as follows. First, as the AC power is turned on, the bases of the switching elements $Q_1$, $Q_2$ are supplied with base currents through the starting resisters $R_{S1}$, $R_{S2}$. Assuming that the switching element $Q_1$ went ON prior to $Q_2$, the switching element $Q_2$ is controlled to go OFF. And, as the output of the switching element $Q_1$, a resonant current flows out into (the series resonant condenser $C_1$)→(primary winding $N_1$)→(primary ground). When the resonant current becomes very close to zero, the switching element $Q_2$ is controlled to go ON and the switching element $Q_1$ to go OFF. And, a resonant current of reverse direction to the previous direction flows through the switching element $Q_2$. Thereafter, the self-excited switching operation will start, having the switching elements $Q_1$, $Q_2$ go ON alternatingly.

Thus, the terminal voltage across the smoothing condenser Ci serves as an operating power source, and the switching elements $Q_1$, $Q_2$ repeat to go ON and OFF alternatingly; thereby a drive current having a waveform similar to a resonant current $I_0$ is supplied to the primary winding $N_1$ of the magnetic coupling transformer MCT via the series resonant condenser $C_1$.

The operation of the power-factor improvement converter 10 relating to this embodiment will now be described in regard to the power-factor improvement.

As described above, the switching operation of the current resonant converter starts, the switching output is supplied to the primary winding $N_1$ of the magnetic coupling transformer MCT. And, the magnetic coupling transformer MCT transfers the alternating voltage of the switching frequency generated by the switching output to the secondary winding Ni through the magnetic coupling.

Since the secondary winding Ni is interposed on the positive output line from the bridge rectifying circuit $D_1$, the switching voltage transferred to the secondary winding is superimposed to the rectified output voltage on the rectifying path. And, owing to the superimposition of the switching voltage, the high-speed recovery type rectifying diode $D_2$ interposed on the rectifying path switches on and off the rectified current at the switching frequency.

Thus, in this power-factor improvement converter 10, the rectified output voltage with the switching output superimposed charges the smoothing condenser Ci, so that the superimposition of the switching voltage lowers the terminal voltage across the smoothing condenser Ci at the switching frequency. Thereby, charging current flows into the smoothing condenser Ci even while the level of the rectified output voltage is lower than the voltage across the smoothing condenser Ci.

Consequently, an average waveform of the AC input current is made similar to that of the AC input voltage to widen a conducting phase angle of the AC input current; thus, improving the power factor.

And, a resonant condenser $C_2$ connected in parallel to the secondary winding Ni of the magnetic coupling transformer MCT and an inductor Li of the foregoing winding Ni form a parallel resonant circuit. This parallel resonant circuit is designed to vary its resonant impedance corresponding to a variation of the load, and when the load of the power circuit decreases, the switching voltage to be fed back to the rectifying path is designed to reduce. Consequently, the terminal voltage across the smoothing condenser Ci is suppressed to boost in the low load.

The power-factor improvement converter 10 relating to this embodiment is designed to set the appropriate power-factor to about 0.90. Concretely, in order to set the power-factor to 0.9 on condition that an input power to the following switching power circuit 1 is 150 W and the AC input voltage $V_{AC}$ is 100 V, the values, ratings, and others of the relevant components are needed to be selected as follows: the filter choke coil $L_N$=100 μH, filter condenser $C_N$=0.1 μF, rating of the high-speed recovery type rectifying diode $D_2$=3 A/20 V, series resonant condenser $C_1$=0.047 μF, inductance Li of the secondary winding Ni=20 μH, inductance $L_1$ of the primary winding $N_1$=50 μH; and for the magnetic coupling transformer MCT, a ferrite EE-type core (size EE-28) is used. And, when the smoothing condenser Ci is set to 560 μF/180 V, the rectified smoothed voltage Ei of 149 V is to be obtained.

FIGS. 2A to 2D are waveform charts showing the operation of the major parts of the power circuit in FIG. 1 with the power frequency, provided with the power-factor improvement converter 10 according to the foregoing construction.

When the AC input voltage $V_{AC}$ 100 V is applied as shown in FIG. 2A, a rectified current $I_1$ running through the high-speed recovery type rectifying diode $D_2$ takes on a waveform that the high frequency current is switched on and off by the switching frequency during τ period in which the level of the AC input voltage is higher than that of the rectified smoothed voltage, as shown in FIG. 2B.

The voltage $V_1$ between the connection point of the high-speed recovery type rectifying diode $D_2$ and secondary winding Ni and the primary ground, which is equivalent to the voltage across the secondary winding Ni of the magnetic coupling transformer MCT, takes on a waveform that the alternating voltage of the switching frequency is superimposed on the rectified output voltage of the bridge rectifying circuit $D_1$, as shown in FIG. 2C. The envelope of the peak level is equivalent to the rectified smoothed voltage Ei.

And, the AC input current $I_{AC}$ assumes a waveform resembling a sine wave during τ period, as shown in FIG. 2D; actually the conducting phase angle is widened to the extent that the power-factor reaches 0.9.

And, FIG. 3 is a waveform chart that shows the operation of the power-factor improvement converter 10 shown in FIG. 1 from the switching period of the current resonant switching converter; hereat, the switching operation by the switching elements $Q_1$, $Q_2$ is illustrated in case of the switching frequency of 100 kHz (one cycle=20 ms).

As described above, the switching elements $Q_1$, $Q_2$ repeat ON/OFF operation alternatingly, and switching currents $I_{C1}$, $I_{C2}$ running through across each collector and emitter assume waveforms shown in FIGS. 3B and 3C, respectively, during the period that the switching elements $Q_1$, $Q_2$ each go ON. Hereat, a potential $V_2$ between the collector and emitter of the switching element $Q_2$ forms in a pulse waveform as shown in FIG. 3A during the period that the switching element $Q_2$ goes OFF.

And, the series resonant current $I_0$ running through the series resonant circuit to which the switching output of the switching elements $Q_1$, $Q_2$ are supplied forms in a sine waveform of a switching period as shown in FIG. 3D.

When comparing the power circuit of this embodiment in FIG. 1 and that of the related art in FIG. 7, the power-factor improvement converter 10 by the self-excited current resonant switching converter as in FIG. 1 achieved the AC-DC power conversion efficiency of 94.5% and the AC-DC power conversion efficiency by the active filter circuit 20 in FIG. 7 is evaluated about 90%; virtually 4.5% improvement is achieved. Thereby, the overall power conversion efficiency of the switching power circuit including the following switching power circuit 1 is also improved. Assuming that the DC-DC conversion efficiency of the switching power circuit 1 is 85%, the same as described in FIG. 7, the overall power conversion efficiency of the power circuit in FIG. 1 is 94.5%×85%=approx. 80.3%, whereas that of the power circuit in FIG. 7 was 76.5%; virtually 3.8% improvement is achieved.

And, since the current resonant switching converter is used in the power-factor improvement converter 10 in FIG. 1, the noise level generated by the switching operation is low. Therefore, as shown in FIG. 1, the normal mode noise filter formed of each one of filter choke coil $L_N$ and filter condenser $C_N$ will suffice for the noise suppression; the π-type noise filter as shown in FIG. 7 is not needed. And, since the common mode noise filter is not necessary to be strengthened, the common mode choke coil CMC and across condenser $C_L$ can also be selected from among smaller and less expensive ones.

And, since the circuit construction of the power-factor improvement converter 10 becomes simpler than that of the active filter 20 shown in FIG. 7, the number of components can be reduced.

And, the power-factor improvement converter 10 relating to this embodiment attains the rectified smoothed voltage of 149 V when the AC input voltage of 100 V is applied, as described above; however, this level is almost equivalent to that of the rectified smoothed voltage obtained when the power-factor improvement converter 10 is not applied. Therefore, existing switching converters for 100 VAC can be used without redesigning as it is, for the following PWM system switching power circuit 1; which is advantageous in regard to cost.

Figure 4:
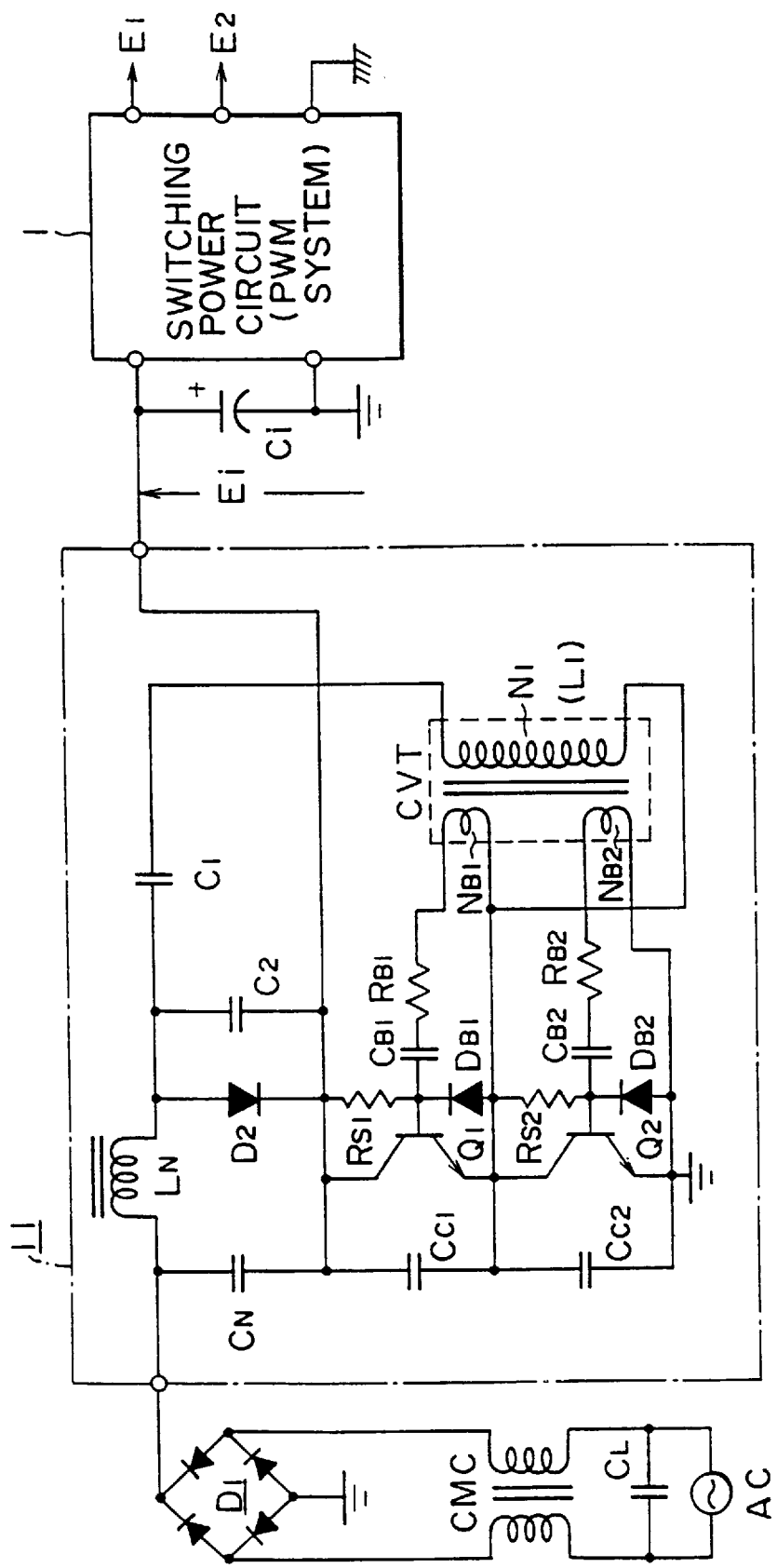
FIG. 4 is a circuit diagram showing a construction of a switching power circuit provided with a power-factor improvement converter of another embodiment.

FIG. 4 is a circuit diagram showing another embodiment relating to the power-factor improvement converter according to the present invention, the identical parts to FIG. 1 are given the same symbols, and the description will be omitted.

In a power-factor improvement converter 11 shown in FIG. 4, a filter choke coil $L_N$ and high-speed recovery type rectifying diode $D_2$ are connected in series to the positive output line of a bridge rectifying circuit $D_1$. In this case, a resonant condenser $C_2$ is connected in parallel to the high-speed recovery type rectifying diode $D_2$, and forms a parallel resonant circuit with the inductance of the filter choke coil $L_N$. The function is similar to the resonant condenser $C_2$ already explained in FIG. 1, and suppresses the boosting of the rectified smoothed voltage in a low AC input voltage or low load.

This power-factor improvement converter 11 is provided with a converter transformer CVT. This converter transformer CVT has a primary winding $N_1$, and a drive winding $N_{B1}$ and $N_{B2}$ each corresponding to the switching element $Q_1$ and $Q_2$ as secondary windings.

And, one terminal of the primary winding $N_1$ of the converter transformer CVT is connected to the connection point of the switching element $Q_1$ and $Q_2$ to which the switching output is supplied. And, the other terminal is connected in series to a series resonant condenser $C_1$ to form a series resonant circuit; further, this terminal of the primary winding $N_1$ is connected to the connection point of the filter choke coil $L_N$ and the high-speed recovery type rectifying diode $D_2$ via the series resonant condenser $C_1$.

In the power-factor improvement converter 11 thus constructed, the switching output given to the primary winding $N_1$ of the converter transformer CVT is fed back to the connection point of the filter choke coil $L_N$ and the high-speed recovery type rectifying diode $D_2$ via the capacitance coupling by the series resonant condenser $C_1$. Thus, due to the switching output applied on the rectifying path, a switching voltage is superimposed on the rectified output voltage; and owing to this superimposition of the switching voltage, the high-speed recovery type rectifying diode $D_2$ switches on and off the rectified current at the switching frequency. Thus thereafter, the operation similar to the one described in FIG. 1 can be obtained; thereby the conducting phase angle of the AC input current can be widened to improve the power factor.

And, also in the power-factor improvement converter 11 according to this embodiment, the same as the embodiment in FIG. 1, the overall power conversion efficiency can be improved and the switching noise level can be reduced compared to the active filter circuit shown in FIG. 7. Therefore, smaller, lighter, and less expensive components can be used for the noise filter and the like to reduce the cost. And, the switching power circuit 1 is not needed to be redesigned.

Further, in the power-factor improvement converter 11 according to this embodiment, the secondary winding Ni wounded on the magnetic coupling transformer MCT in the foregoing embodiment in FIG. 1 is omitted. Therefore, the converter transformer CVT can be made smaller than the magnetic coupling transformer MCT; to that extent, the circuit size of the power-factor improvement converter 11 can be cut down.

Figure 5:
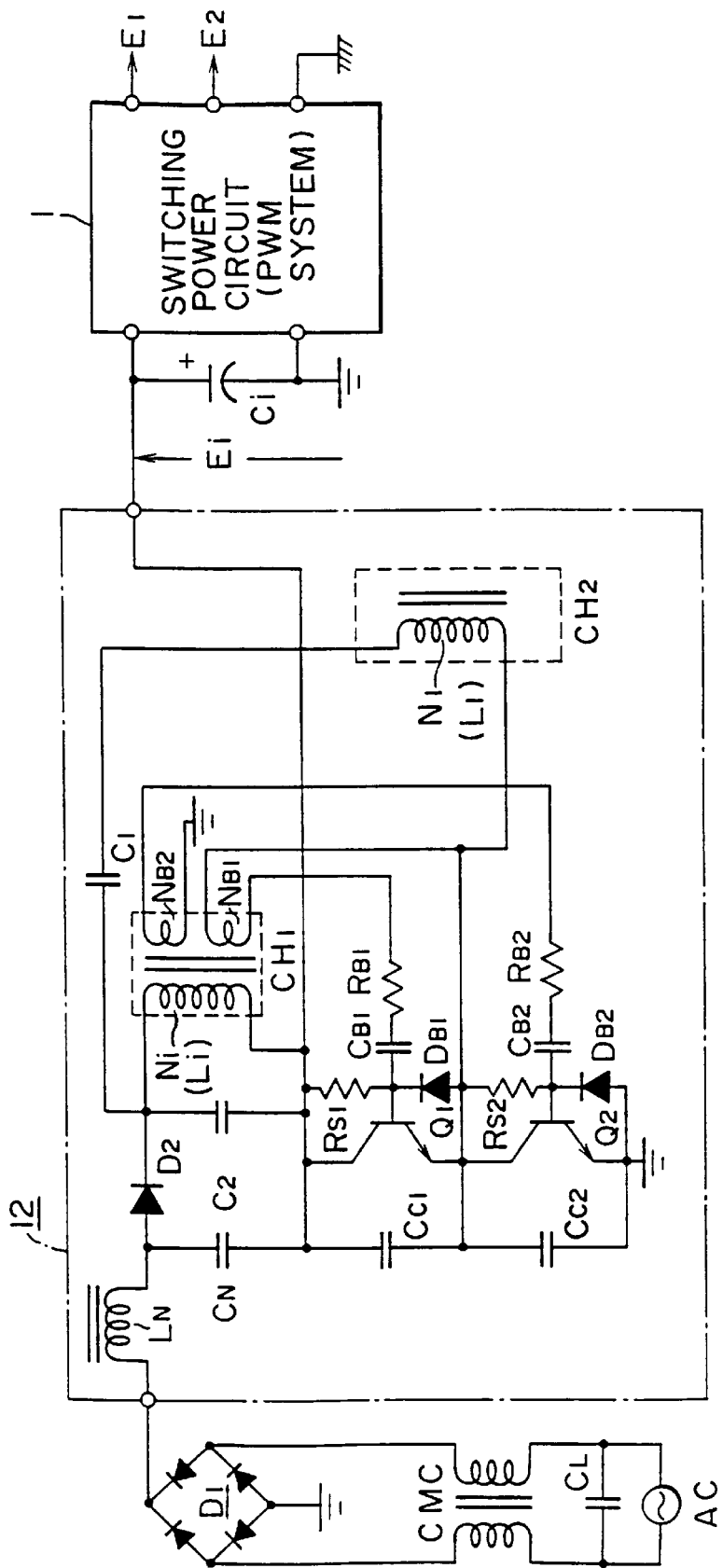
FIG. 5 is a circuit diagram showing a construction of a switching power circuit provided with a power-factor improvement converter of another embodiment.

FIG. 5 is a circuit diagram showing another embodiment according to the present invention, and the parts identical to those in FIG. 1 and 4 are given the same symbols and the description will be omitted.

A power-factor improvement converter 12 shown in FIG. 5 is provided with a choke coil $CH_1$ that a secondary winding Ni interposed in series on the rectifying path and driving windings $N_{B1}$, $N_{B2}$ are wound, and a choke coil $CH_2$ that a primary winding $N_1$ is wound. Namely, in the power-factor improvement converter 12, the primary and secondary of the magnetic coupling transformer MCT in the foregoing embodiment shown in FIG. 1 are separated to form an independent choke coil $CH_1$ and $CH_2$. Therefore, the power-factor improvement operation is similar to that in FIG. 1, the switching operation of the high-speed recovery type rectifying diode $D_2$ is prompted on the basis of the switching voltage superimposed on the rectified output given through the inductor of the secondary winding Ni, in consequence, the power-factor is improved. And, the power-factor improvement converter 12 in this embodiment has an equivalent effect to the power-factor improvement converter 10 in FIG. 1.

Figure 6:
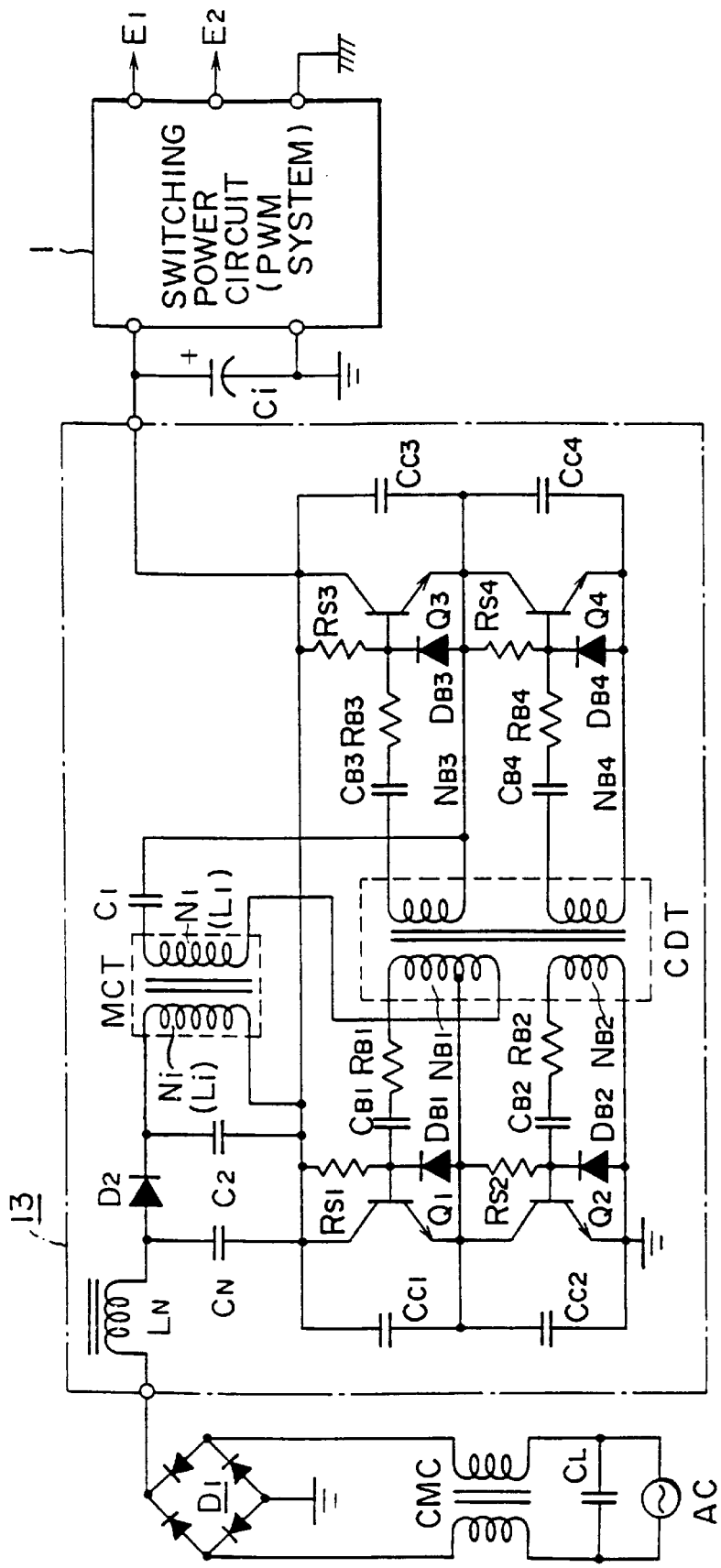
FIG. 6 is a circuit diagram showing a construction of a switching power circuit provided with a power-factor improvement converter of another embodiment.

FIG. 6 is a circuit diagram showing another embodiment according to the present invention, and the parts identical to those in FIG. 1, 4 and 5 are given the same symbols and the description will be omitted.

In a power-factor improvement converter 13 shown in FIG. 6, an self-excited current resonant switching converter is applied which forms a full-bridged coupling using four switching elements. This converter can handle a heavier load than those in the other embodiments, and first, the construction of the current resonant switching converter in this power-factor improvement converter 13 will be described.

In the current resonant switching converter provided inside the power-factor improvement converter 13, four transistors $Q_1, Q_2, Q_3, Q_4$ are the switching elements to form the full-bridged switching converter. As shown in FIG. 6, the switching elements $Q_1, Q_2$ are connected in series between the positive terminal of a smoothing condenser Ci and the ground through each collector and emitter. And, the switching elements $Q_3, Q_4$ are connected in the same manner as above.

And, resisters $R_{S1}, R_{S2}$ are the starting resisters inserted between each collector and base of the switching elements $Q_1, Q_2$; diodes $D_{B1}, D_{B2}$ are the clamping diodes inserted between each base and emitter of the switching elements $Q_1$, $Q_2$, which form current paths in the reverse direction in the period of switching-off. And, the damping resisters $R_{B1}, R_{B2}$ regulate the base currents (drive currents) of the switching elements $Q_1, Q_2$, respectively. And, the resonant condensers $C_{B1}, C_{B2}$ form self-oscillating series resonant circuits with drive windings $N_{B1}, N_{B2}$ of a drive transformer PRT described later. These elements form drive circuit systems for the switching elements $Q_1, Q_2$.

And, the switching elements $Q_3, Q_4$ each are provided with the starting resisters $R_{S3}, R_{S4}$, clamping diodes $D_{B3}$, $D_{B4}$, damping resisters $R_{B3}, R_{B4}$, resonant condensers $C_{B3}$, $C_{B4}$, drive windings $N_{B3}, N_{B4}$ in the same connecting form as above, which form drive circuit systems for the switching elements $Q_3, Q_4$.

And in this case, condensers $C_{C1}, C_{C2}, C_{C3}, C_{C4}$ are connected between each collector and emitter of the switching elements $Q_1, Q_2, Q_3, Q_4$, respectively, to absorb switching noises.

A converter drive transformer CDT is provided to drive the switching elements $Q_1$–$Q_4$, which, in this case, is composed of the drive windings $N_{B1}, N_{B2}, N_{B3}, N_{B4}$ and a resonant current detecting winding ND wound up on the drive winding $N_{B1}$.

One terminal of the drive winding $N_{B1}$ for the switching element $Q_1$ of the converter transformer CDT is connected to the resonant condenser $C_{B1}$, and the other terminal to the emitter of the switching element $Q_1$. And, one terminal of the drive winding $N_{B2}$ for the switching element $Q_2$ is connected to the ground, and the other terminal to the condenser $C_{B2}$, so as to induce a voltage of a reverse polarity against a voltage induced across the drive winding $N_{B1}$.

And, one terminal of the drive winding $N_{B3}$ for the switching element $Q_3$ is connected to the condenser $C_{B3}$, and the other terminal to the emitter of the switching element $Q_3$. And, one terminal of the drive winding $N_{B4}$ for the switching element $Q_4$ is connected to the ground, and the other terminal to the condenser $C_{B4}$, so as to induce a voltage of a reverse polarity against a voltage induced across the drive winding $N_{B3}$.

In this case, the switching output of the switching elements $Q_1$–$Q_4$ is supplied to a series resonant circuit formed of a primary winding $N_1$ of a magnetic coupling transformer MCT and a series resonant condenser $C_1$.

One terminal of the series resonant circuit, that is, one terminal of the primary winding $N_1$ of the magnetic coupling transformer MCT is connected to the connection point (switching output point) of the emitter and collector of the switching elements $Q_1$, $Q_2$ via the resonant current detecting winding $N_D$, and the other terminal is connected to the connection point (switching output point) of the emitter and collector of the switching elements $Q_3$, $Q_4$ via the series resonant condenser $C_1$.

In the current resonant switching converter thus constructed, the pair of the switching elements $[Q_1, Q_4]$ and the pair of the switching elements $[Q_2, Q_3]$ switch on/off alternatingly.

First, as the AC power is turned on, the bases of the switching elements $Q_1$–$Q_4$ are supplied with base currents through the starting resisters $R_{S1}$–$R_{S4}$. Assuming that the switching elements $[Q_1, Q_4]$ went ON prior to $[Q_2, Q_3]$, the switching elements $[Q_2, Q_3]$ are controlled to go OFF. And, as the output of the switching elements $[Q_1, Q_4]$, a resonant current flows out into a path: (the collector—emitter of the switching element $Q_1$)→(resonant current detecting winding $N_D$)→(primary winding $N_1$ of the magnetic coupling transformer MCT)→(series resonant condenser $C_1$)→ (collector—emitter of the switching element $Q_4$)→→ (primary ground). When the resonant current becomes very close to zero, the switching elements $[Q_2, Q_3]$ are controlled to go ON and the switching elements $[Q_1, Q_4]$ to go OFF. And, a resonant current of reverse direction to the previous direction flows into the series resonant circuit through the switching element $Q_2$. Thereafter, the self-excited switching operation will start, having the switching elements $[Q_1, Q_4]$ and $[Q_2, Q_3]$ go ON alternatingly. Thus, the terminal voltage across the smoothing condenser Ci serves as an operating power source, and the switching elements $[Q_1, Q_4]$ and $[Q_2, Q_3]$ repeat to go ON and OFF alternatingly; thereby a drive current having a waveform similar to the resonant current is supplied to the primary winding $N_1$ of the magnetic coupling transformer MCT forming the series resonant circuit.

The magnetic coupling transformer MCT provided in the power-factor improvement converter 13 is constructed with the primary winding $N_1$ forming the series resonant circuit of the current resonant switching converter and the secondary winding Ni inserted on the rectifying output line in the similar connecting form as in FIG. 1, which are magnetically close coupled.

And, in the power-factor improvement converter 13 as constructed above, when the switching operation of the current resonant converter starts as described above, the switching output is supplied to the primary winding $N_1$ of the magnetic coupling transformer MCT, and the magnetic coupling transformer MCT induces a switching voltage to the secondary winding Ni through the magnetic coupling. Thus, also in this embodiment, the power factor is improved by the same operation as described in FIG. 1.

Although the power-factor improvement converter 13 in this embodiment uses four switching elements and other components, when it is compared to the active filter circuit 20 shown in FIG. 7 designed so as to be able to handle a substantially same level of load, this embodiment achieves the reduction of the components and the size, with the improvement of the power conversion efficiency and the reduction of the switching noises accompanied.

Further, it is needless to say that a flyback converter by the PWM system, feed-forward converter, ringing choke converter, or various types of switching converters by the other systems can be applied to the switching power circuit 1 in the foregoing embodiments; however, preferably a switching converter is connected which the current or voltage waveform in the switching operation is rectangular.

As described hereinabove, since the power-factor improvement converter according to the present invention feeds back the switching output of the self excited current resonant switching converter to the rectifying circuit to improve the power-factor, it improves the power conversion efficiency more than the active filter. And, the current resonant switching converter can be constructed simpler than the active filter, and in addition, the switching noises can be drastically reduced so that the noise filers are not needed to be strengthened. Therefore, the size of the circuit board for the power-factor improvement converter and power circuit can be made smaller and lighter; to that extent, the cost can be reduced.

Furthermore, applying the current resonant switching converter as the power-factor improvement converter generates a dc output voltage (rectified smoothed voltage) virtually equivalent to the AC input voltage; therefore, redesigning the following switching power circuit is not needed especially when used for the 100 VAC system, thereby it is advantageous in terms of cost reduction and product control.

While specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A power-factor improvement converter comprising:
   a normal mode low-pass filter formed of a filter choke coil and a filter condenser, provided at an output of a rectifying circuit;
   a high-speed recovery type rectifying element interposed in series on a rectifying current path of the rectifying circuit;
   a current resonant switching converter that performs a switching operation by using a rectified smoothed voltage distributed from a smoothing circuit as an operating power source and supplies a switching output thereof to a series resonant circuit formed of a series resonance condenser and an inductor of a series resonant winding; and power-factor improvement means for improving a power factor based on the switching output fed back to the rectifying current path from said series resonant circuit.

2. A power-factor improvement converter as claimed in claim 1, wherein said current resonant switching converter is a self-oscillating circuit for driving switching elements by self-oscillation.

3. A power-factor improvement converter as claimed in claim 1, wherein said current resonant switching converter is formed by coupling two switching elements in a half-bridged formation.

4. A power-factor improvement converter as claimed in claim 1, wherein said current resonant switching converter is formed by coupling four switching elements in a full-bridged formation.

\* \* \* \* \*